United States Patent
Freitag et al.

(10) Patent No.: US 10,540,218 B2
(45) Date of Patent: Jan. 21, 2020

(54) PROCESSOR SYSTEM AND METHOD FOR MONITORING PROCESSORS

(71) Applicant: AIRBUS DEFENCE AND SPACE GMBH, Taufkirchen (DE)

(72) Inventors: Johannes Freitag, Unterhaching (DE); Dietmar Geiger, Ulm (DE); Bernd Koppenhoefer, Ulm (DE); Sascha Uhrig, Duerrnhaar (DE); Max Gapp, Blaustein (DE)

(73) Assignee: Airbus Defence and Space GmbH, Taufkirchen (DE)

(*) Notice: Subject to any disclaimer, the term of this patent is extended or adjusted under 35 U.S.C. 154(b) by 213 days.

(21) Appl. No.: 15/689,201

(22) Filed: Aug. 29, 2017

(65) Prior Publication Data
US 2018/0060147 A1 Mar. 1, 2018

(30) Foreign Application Priority Data
Aug. 30, 2016 (EP) .................................... 16186314

(51) Int. Cl.
  *G06F 11/00* (2006.01)
  *G06F 11/30* (2006.01)
  *G06F 11/34* (2006.01)

(52) U.S. Cl.
  CPC ........ *G06F 11/004* (2013.01); *G06F 11/3024* (2013.01); *G06F 11/3409* (2013.01)

(58) Field of Classification Search
  CPC .................................................. G06F 11/004
  USPC .......................... 714/47.3, 47.1, 47.2, 48, 51
  See application file for complete search history.

(56) References Cited

U.S. PATENT DOCUMENTS

| | | | |
|---|---|---|---|
| 2012/0151276 A1 | 6/2012 | Bjorner et al. | |
| 2014/0229956 A1* | 8/2014 | Fornaeus | G06F 9/5077 718/104 |
| 2015/0229310 A1* | 8/2015 | Chang | H03K 19/17728 326/38 |
| 2015/0261979 A1 | 9/2015 | Aue | |

(Continued)

OTHER PUBLICATIONS

Extended European Search Report for Application No. 16186314 dated Mar. 13, 2017.

(Continued)

*Primary Examiner* — Dieu Minh T Le
(74) *Attorney, Agent, or Firm* — Jenkins, Wilson, Taylor & Hunt, P.A.

(57) ABSTRACT

A processor system includes an application processor, which has a processor core and hardware performance counters, and a monitoring processor, which is coupled to the application processor by a data transmission interface. The monitoring processor has a look-up table, in which target performance profiles of the progression over time of performance events of the hardware performance counters are stored for an application which is to be executed on the application processor and monitored. The monitoring processor has an evaluating logic which is linked to the look-up table and is configured to record the progression over time of performance events of the hardware performance counters during the execution of the application to be monitored on the application processor and to compare the progression with the target performance profiles stored in the look-up table.

15 Claims, 1 Drawing Sheet

(56) References Cited

U.S. PATENT DOCUMENTS

2016/0062810 A1 3/2016 Von Wendorff
2016/0191917 A1* 6/2016 Fu .......................... H04N 19/13
375/240.07

OTHER PUBLICATIONS

Markettos et al., "Interconnect for Commodity FPGA Clusters: Standardized or Customized?," 2014 24th International Conference on Field Programmable Logic and Applications (FPL), Technical University of Munich, pp. 1-8, dated Sep. 2, 2014.
Summons to Attend Oral Proceedings for European Application No. 16186314.7 dated May 29, 2019.

* cited by examiner

PROCESSOR SYSTEM AND METHOD FOR MONITORING PROCESSORS

CROSS-REFERENCE TO RELATED APPLICATION

This application claims priority to European Patent Application EP 16 186 314.7 filed Aug. 30, 2016, the entire disclosure of which is incorporated by reference herein.

TECHNICAL FIELD

The present disclosure relates to a processor system, in particular comprising a multi-core processor, and to a method for monitoring processors, in particular for an application in critical systems.

BACKGROUND

Even though the processor systems described herein can be used universally, in particular in various types of vehicles, the principles and modes of operation of the processor systems and the problem addressed thereby are described in greater detail with reference to an aircraft. In principle, however, the present disclosure can also be used in other aircraft and in water vehicles, rail vehicles, spacecraft or the like which are suitable for transporting people. Furthermore, the present disclosure can also be used in stationary applications, such as in safety-related systems, which must comply with the standard IEC61508/IEC61511, according to which electrical, electronic or programmable electronic components of the system of which the failure can mean a significant risk for people, equipment or the environment must adhere to safety-oriented design principles.

Multi-core processors provide cost-effective, scalable and energy-efficient processing power for embedded systems. In addition to the efficient use of available parallel processing resources, it must be ensured that non-functional requirements, in particular in the area of real-time capability, failure safety, observance of energy/loss performance limits, fault tolerance, protection against data manipulation and security against attacks, can be adhered to in the case of use in critical target applications such as driver assistance systems, industrial automation or medical technology.

When executing safety-related applications alongside other applications on multi-core processors, the latency periods for accessing data during the execution of the applications should be as short as possible. The distribution of these latency periods should be kept within narrow limits, since the worst case scenario must always be assumed when planning safety-related applications in a system. Targeted optimisation for registers, caches and memory connection is therefore indispensable.

US 2014/0229956 A1 discloses a multi-processor-core system comprising distributed processor cores and resource monitors executed thereon; if, as indicated by one of the resource monitors, an application executed on a first processor core has insufficient resources, the resource allocation for an application executed on a second processor core can be restricted.

US 2012/0151276 A1 discloses a computer-monitoring system, in which various performance parameters are retrieved and statistically analysed in order to identify deviations from a standard behavior, which indicates a deterioration in performance and imminent failure of the computer.

SUMMARY

One of the ideas of the disclosure herein relates to finding solutions for monitoring applications running on processors which can recognize temporal anomalies in applications and counteract the anomalies. In particular, one of the ideas of the disclosure herein is to continuously check for malfunctions in safety-related applications for a system to be monitored and, as part of safety regulations, to ensure that behavioral and functional limits of safety-related applications of this type are adhered to.

Thus, according to a first aspect of the disclosure herein, a processor system comprises at least one application processor, which has at least one processor core and a plurality of hardware performance counters, and a monitoring processor, which is coupled to the at least one application processor by a data transmission interface. The monitoring processor firstly comprises a look-up table, in which target performance profiles of the progression over time of performance events of at least one of the plurality of hardware performance counters are stored for an application which is to be executed on the at least one application processor and monitored. The monitoring processor secondly comprises an evaluating logic which is linked to the look-up table and is configured to record the progression over time of performance events of the at least one of the plurality of hardware performance counters during the execution of the application to be monitored on the at least one application processor and to compare the progression with the target performance profiles stored in the look-up table.

According to a second aspect of the disclosure herein, an avionics system for an aircraft, in particular a passenger aircraft, a cargo aircraft or a military aircraft, comprises at least one processor system according to the first aspect of the disclosure herein. Avionics systems of this type can comprise for example flight monitoring systems, flight control systems, navigation systems, aircraft communication systems, flight sensor systems and/or flight mission systems.

According to a third aspect of the disclosure herein, a method for monitoring an application processor comprises steps of executing at least one application to be monitored on an application processor, which has at least one processor core, recording the progression over time of performance events for the at least one application to be monitored using a plurality of hardware performance counters, transmitting the recorded progressions over time of performance events to a monitoring processor, and comparing the recorded progression over time of performance events of the at least one of the plurality of hardware performance counters during the execution of the application to be monitored with target performance profiles, stored in a look-up table of the monitoring processor, of the progression over time of performance events of at least one of the plurality of hardware performance counters.

One of the concepts on which the present disclosure is based relates to using the installed event counters in modern processors to count different internal performance events when executing an application, to create a profile of the progression over time of one or more of the performance events when the application is executed as expected and in a functionally correct manner, and to use these profiles as a reference fingerprint for monitoring the application during the operation of the processor. For this purpose, during operation, progressions over time of one or more of the performance events used as a reference are recorded and compared with the reference fingerprint. Should the progressions over time deviate by a predetermined extent from the reference progressions during the monitoring operation, it can be concluded that the application is not being executed as expected or in a functionally correct manner, and therefore countermeasures can be introduced so as to be able to ensure that the correct operation of the whole system in general, or of the application monitored in each case in particular, is maintained.

In particular, by the processor system, continuous monitoring of some or all of the running applications can be implemented, as a result of which safety integrity levels, in particular for safety-related or safety-critical applications, can advantageously be adhered to.

Another advantage of this processor system lies in the ability to promptly detect influences, over time, of competing applications on application processors, in particular multi-core processors, so that unpredictable behavior of the execution environment as a whole as a result of the mutual influence of the individual applications can be prevented in good time.

According to one embodiment of the processor system, the application processor can comprise a multi-core processor having at least two processor cores.

According to another embodiment of the processor system, the hardware performance counters can be configured to count memory accesses, buffer memory accesses and/or the number of executed commands.

According to another embodiment of the processor system, the application to be monitored can comprise a safety-related application.

According to another embodiment of the processor system, the data interface can be a debug interface of the application processor.

According to another embodiment of the processor system, the monitoring processor can be a FGPA, which can be configured to read the progression over time of the counter readings via the Aurora protocol.

According to another embodiment of the processor system, the monitoring processor can be configured to record the target performance profiles during one or more reference execution processes of the application to be monitored and store the profiles in the look-up table.

According to another embodiment of the processor system, target performance profiles of the progression over time of performance events of several of the plurality of hardware performance counters for multiple applications to be executed on the application processor and monitored can be stored in the look-up table.

According to another embodiment of the processor system, the multiple applications to be executed on the application processor and monitored can comprise safety-related and non-safety-related applications.

According to one embodiment of the method, the method can further comprise the step of recording the target performance profiles during a reference execution process of the application to be monitored and storing the recorded target performance profiles in the look-up table.

According to another embodiment of the method, target performance profiles of the progression over time of performance events of several of the plurality of hardware performance counters for multiple applications to be executed on the application processor and monitored can be stored in the look-up table.

According to another embodiment of the method, the multiple applications to be executed on the application processor and monitored can comprise safety-related and non-safety-related applications.

The configurations and developments above can be combined with one another as desired where appropriate. Further possible configurations, developments and implementations of the disclosure herein also comprise not explicitly mentioned combinations of features of the disclosure herein described previously or in the following with respect to the embodiments. In particular, a person skilled in the art will also add individual aspects as improvements or additions to the particular basic form of the present disclosure.

BRIEF DESCRIPTION OF THE DRAWINGS

The present disclosure will be described in greater detail below with reference to the embodiments shown in the schematic drawings, in which.

The accompanying drawings are intended to provide further understanding of the embodiments of the disclosure herein. They illustrate embodiments and are used, in conjunction with the description, to explain principles and concepts of the disclosure herein. Other embodiments and many of the above-mentioned advantages emerge from the drawings. The elements of the drawings are not necessarily shown to scale with respect to one another.

In the figures of the drawings, elements, features and components which are like, functionally like or have the same effect—unless otherwise specified—are each provided with the same reference signs.

DETAILED DESCRIPTION

Figure 1:
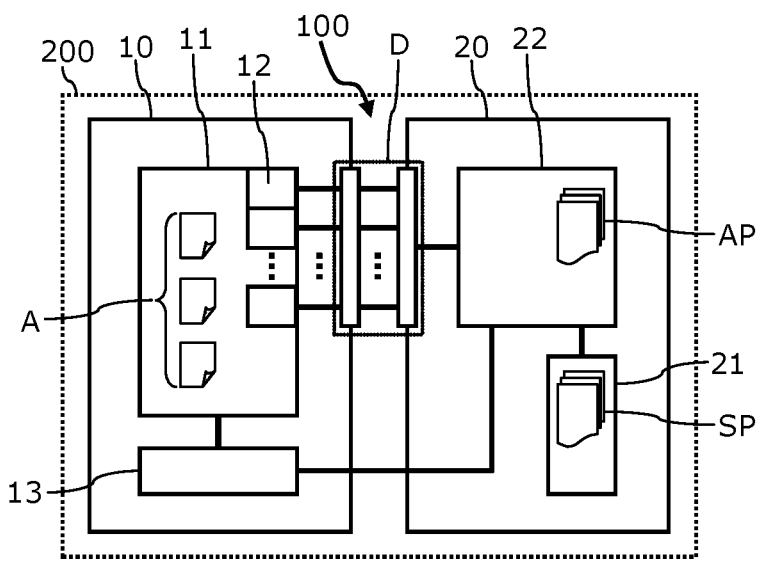
FIG. 1 is an abstract block diagram of a processor system according to one embodiment of the disclosure herein.

FIG. 1 is an abstract block diagram of a processor system 100 comprising an application processor 10 and a monitoring processor 20. The processor system 100 is shown as being included in a superordinate system 200. The superordinate system 200 can be for example a system in which safety-related or safety-critical applications have to be executed and monitored. For example, the superordinate system 200 can be an avionics system of an aircraft, for example a flight monitoring system, a flight control system, a navigation system, an aircraft communication system, a flight sensor system and/or a flight mission system. Of course, the superordinate system 200 can also be used in another field of application, for example in a road vehicle, a rail vehicle, in the process industry, in building automation, in field system technology, in industrial manufacturing or system installations or the like.

The application processor 10 comprises at least one processor core 11, on which or for which a plurality of hardware performance counters 12 are implemented. In this case, the hardware performance counters 12 (HPCs) can comprise performance indicators which allow the measurement of numerous different and chronologically broken-down performance events from the monitored hardware, which are linked to the behavior of the processor core 11. Performance events of this type comprise for example accesses to buffer memories, caches or other processor memories, the number of statement executions, failed memory accesses, failed statement executions and various internal processor states. In this case, the hardware performance counters 12 can provide application-specific counter data, which can help when analysing the respective applications A executed on the processor core 11.

The data from the hardware performance counters 12 can be transmitted externally in a chronological manner and divided up by data type via a data interface D of the application processor 10. A data interface D of this type can be for example a debug interface, which can be accessed for example via the Aurora data-transmission protocol, i.e. a debug interface which has the bandwidth required for the monitoring.

The monitoring processor 20 of the processor system 100 is coupled to the application processor 10 via the data interface D. The monitoring processor 20 comprises an evaluating logic 22 and a look-up table 21 (LUT) coupled to the evaluating logic 22. The look-up table 21 is used for storing target performance profiles SP of the progression over time of performance events, which profiles can be recorded by one or more of the hardware performance counters 12. These target performance profiles SP can be stored for example in the form of a two-dimensional chart having a time axis and a counter reading axis. However, it is also possible to store the target performance profiles SP in a statistically processed form such that for example statistical comparison parameters such as median values, moving averages or other statistical data parameters can be stored over time. In addition, it is also possible to store the target performance profiles SP in fragments which are compiled according to the current circumstances during evaluation. In this case, the target performance profiles SP are each assigned to an application A to be executed on the application processor 10 and monitored.

The target performance profiles SP can be recorded for example by the monitoring processor 20 during one or more reference execution process(es) of the application(s) A to be monitored. In this case, an execution of the application(s) A on the application processor 10 is carried out under defined constraints and whilst externally monitoring the functionality of the application(s) A. In particular, an application can be executed in "stand-alone" operation, that is to say without executing competing applications on the application processor 10 at the same time. The target performance profiles SP obtained during a reference execution process of this type can be stored in the look-up table 21 by the monitoring processor.

The evaluating logic 22 can access the reference values from the hardware performance counters 12 stored in the look-up table 21 in order to allow monitoring during actual operation of the application(s) A. In this case, the monitoring requires the real-time recording of corresponding progressions over time of performances events of those of the plurality of hardware performance counters with which the target performance profiles SP can be compared. A comparison of this type can be carried out for example using statistics or statistical means, in that statistical parameters of the progressions over time, such as temporally moving averages, systematic time delays, deviations in the variance or the like, are compared with one another and classified as abnormal if predetermined tolerance thresholds are exceeded or not reached. It is also possible to evaluate target performance profiles SP of various hardware performance counters 12 together with the corresponding progressions over time in actual operation and to only reach an abnormal classification if, at the same time, a plurality of the hardware performance counters 12 deviate from the target performance profiles SP and thereby exceed predetermined tolerance thresholds.

If the monitored applications A do not behave as expected, the evaluating logic 22 itself or a corresponding component (not explicitly shown) in the monitoring processor 20 can output a control signal to a processor control system 13 in the application processor 10 at the request of the evaluating logic 22, which signal introduces countermeasures in the monitored system. For example, the processor control system 13 in the application processor 10 can restrict or temporarily shut off one of the processor cores 11. It is also possible to reset and restart the entire application processor 10 or at least selected competing applications A.

Figure 2:
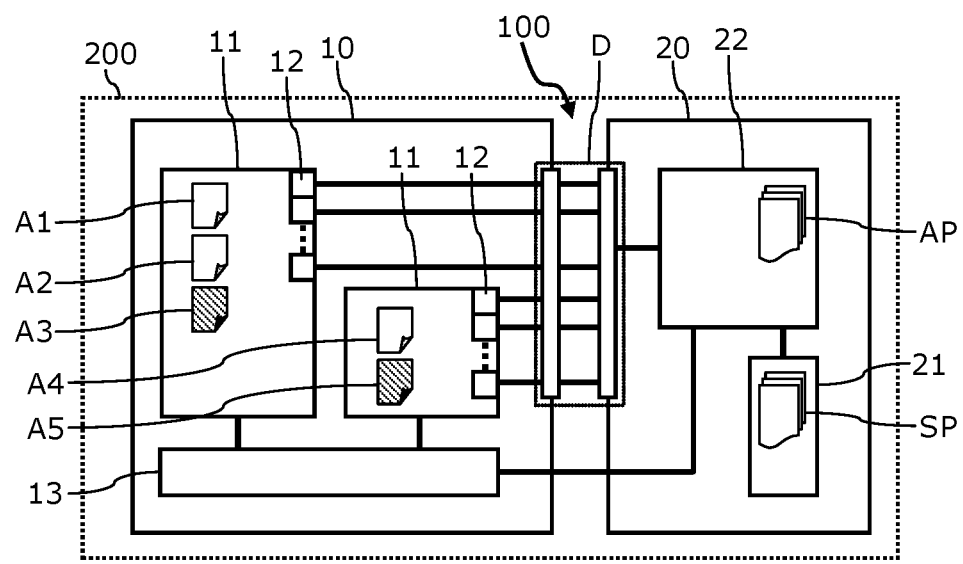
FIG. 2 is a detailed block diagram of a processor system according to another embodiment of the disclosure herein.

FIG. 2 is a block diagram of a processor system 100, which comprises an application processor 10 and a monitoring processor 20 and has a higher degree of detail in comparison with the processor system 100 from FIG. 1. Generally, several or all of the properties, functions and operating parameters which have been described in connection with the components from FIG. 1 can also be transferred analogously to the corresponding components of the processor system from FIG. 2. Both the processor system from FIG. 1 and the processor system from FIG. 2 can make use of the method for monitoring an application processor.

The processor system 100 from FIG. 2 can comprise for example a multi-core processor 10 (MCP), which has more than one complete main processor core in a single chip. In a MCP 10 of this type, some or all of the resources, such as buffers, buses or caches, can be implemented two or more times, such that the individual processor cores are complete processing cores operating largely independently of one another and having their own register sets and arithmetic logic units. In this case, the MCP 10 can be a homogeneous or heterogeneous MCP 10.

The MCP 10 can comprise in particular processor cores 11 on which applications are executed of which some are safety-related and some are non-safety-related. In the example shown in FIG. 2, the applications A1 and A2 on the first processor core 11 (shown on the left) and the application A4 on the second processor core 11 (shown on the right) are non-safety-related applications. By contrast, the applications A3 and A5 can be for example safety-related applications The MCP 10 can be for example a dual-core processor, such as a NXP P5020. The monitoring processor 20 can be implemented for example as a FPGA, the evaluating logic 22 of which can be implemented in an integrated processor, for example a softcore or hardcore processor. The monitoring processor 20, for example a FPGA, could, for example, be coupled to a debug interface D of the application processor 10 via the Aurora data-transmission protocol. On account of the connection to a debug interface D, interference in the operation of the application processor 10 by the operation of the monitoring processor 20 can be avoided.

Figure 3:
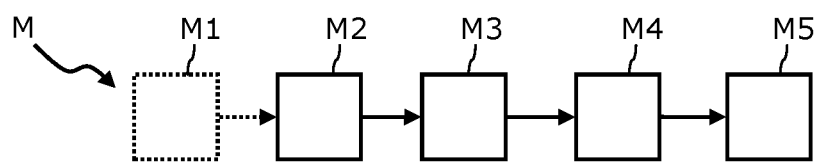
FIG. 3 is a schematic flow chart for a method for monitoring an application processor according to yet another embodiment of the disclosure herein.

FIG. 3 is a schematic flow chart for a method M for monitoring an application processor. The method M can be implemented for example using a processor system, for example a processor system 100 from either FIG. 1 or FIG. 2. The method M can be used for example in an avionics system of an aircraft, for example to monitor processors in flight monitoring systems, flight control systems, navigation systems, aircraft communication systems, flight sensor systems and/or flight missions systems.

Optionally, in a preparatory step M1 of the method M, target performance profiles SP are recorded during one or more reference execution process(es) of an application A to be monitored on an application processor 10 of a processor system 100. These target performance profiles SP can be stored in a look-up table 21 of a monitoring processor 20. In this case, for example target performance profiles SP of the progression over time of performance events of several of a plurality of hardware performance counters 12 for multiple applications A to be executed on the application processor 10 and monitored can be stored in the look-up table 21.

In a step M2, at least one application A to be monitored is then executed on the application processor 10, which has at least one processor core 11. In some embodiments, the application processor 10 can also have a plurality of processor cores 11. In a step M3, the progression over time of performance events AP for the at least one application A to be monitored is recorded using the plurality of hardware performance counters 12, which are implemented in the application processor 10 for the various processor cores 11. The recorded progressions over time of performance events AP are then transmitted to a monitoring processor 20 in step M4.

Lastly, the recorded progressions over time of performance events AP of the at least one of the plurality of hardware performance counters 12 whilst executing the application A to be monitored are compared with the target performance profiles SP of the progression over time of performance events of at least one of the plurality of hardware performance counters 12. For example, the comparison can take place selectively for multiple applications A to be executed on the application processor 10 and monitored. For example, in this case, it is possible to distinguish between safety-related and non-safety-related applications.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein comprise non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

In the detailed description above, various features have been summarized in one or more examples so as to provide a more rigorous illustration. However, it should be clear here that the above description is of a purely illustrative, but in no way limiting nature. The description is used to cover all alternatives, modifications and equivalents of the various features and embodiments. Many other examples will become immediately clear to a person skilled in the art in view of the above description given their specialised knowledge.

The embodiments have been selected and described in order to be able to show, as clearly as possible, the principles on which the disclosure herein is based and the possible applications thereof in practice. Consequently, people skilled in the art can optimally modify and use the disclosure herein and the various embodiments thereof with respect to intended use. The terms "containing" and "comprising" are used as neutral linguistic terminology for the corresponding term "including". Furthermore, use of the terms "a", and "an" is not intended to, in principle, exclude a plurality of features and components described in this way.

Unless explicitly stated otherwise, articles such as "a" or "an" are generally intended to be understood to mean one or more of the described objects. Accordingly, expressions such as "a device which is configured" are intended to include one or more devices indicated in this manner. One or more devices indicated in this manner can carry out the indicated implementations in combination. For example, the statement "a processor which is configured to carry out A, B and C" can also include a first processor which carries out A, in combination with a second processor, which carries out B and C.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A processor system, comprising:
at least one application processor, which comprises at least one processor core and a plurality of hardware performance counters; and
a monitoring processor, which is coupled to the at least one application processor by a data-transmission interface, and which comprises:
a look-up table, in which target performance profiles of progression over time of performance events of at least one of the plurality of hardware performance counters are stored for an application which is to be executed on the at least one application processor and monitored, and
an evaluating logic which is linked to the look-up table and is configured to record the progression over time of performance events of the at least one of the plurality of hardware performance counters during execution of the application to be monitored on the at least one application processor and to compare the progression with the target performance profiles stored in the look-up table;
wherein the data-transmission interface is a debug interface of the application processor.

2. The processor system of claim 1, wherein the application processor comprises a multi-core processor comprising at least two processor cores.

3. The processor system of claim 1, wherein the hardware performance counters are configured to count at least one of memory accesses, buffer memory accesses and a number of executed commands.

4. The processor system of claim 1, wherein the application to be monitored comprises a safety-related application.

5. The processor system of claim 1, wherein the monitoring processor is an FPGA which is configured to read the progression over time of the counter readings via an Aurora protocol.

6. The processor system of claim 1, wherein the monitoring processor is configured to record the target performance profiles during a reference execution process of the application to be monitored and store the profiles in the look-up table.

7. The processor system of claim 1, wherein target performance profiles of the progression over time of performance events of several of the plurality of hardware performance counters for multiple applications to be executed on the application processor and monitored are stored in the look-up table.

8. The processor system of claim 7, wherein the multiple applications to be executed on the application processor and monitored comprise safety-related and non-safety-related applications.

9. The processor system of claim 1, wherein the at least one application processor comprises a plurality of application cores; and wherein each of the plurality of application cores comprises discrete resources that are separate from the resources of every other application core of the plurality of application cores.

10. An avionics system for an aircraft, which comprises at least one processor system, the processor system comprising:

at least one application processor, comprising at least one processor core and a plurality of hardware performance counters; and a monitoring processor, which is coupled to the at least one application processor by a data-transmission interface, and which comprises:

a look-up table, in which target performance profiles of progression over time of performance events of at least one of the plurality of hardware performance counters are stored for an application which is to be executed on the at least one application processor and monitored, and an evaluating logic which is linked to the look-up table and is configured to record the progression over time of performance events of the at least one of the plurality of hardware performance counters during execution of the application to be monitored on the at least one application processor and to compare the progression with the target performance profiles stored in the look-up table;

wherein the data-transmission interface is a debug interface of the application processor.

11. The avionics system of claim 10, wherein the avionics system comprises at least one of a flight monitoring system, a flight control system, a navigation system, an aircraft communication system, a flight sensor system and a flight mission system.

12. A method for monitoring an application processor, the method comprising:

executing at least one application to be monitored on an application processor, which has at least one processor core;

recording progression over time of performance events for the at least one application to be monitored using a plurality of hardware performance counters;

transmitting the recorded progressions over time of performance events from the application processor to a monitoring processor via a data-transmission interface; and comparing the recorded progression over time of performance events of the at least one of the plurality of hardware performance counters during execution of the application to be monitored with target performance profiles, stored in a look-up table of the monitoring processor, of the progression over time of performance events of at least one of the plurality of hardware performance counters;

wherein the data interface is a debug interface of the application processor.

13. The method of claim 12, further comprising recording the target performance profiles during a reference execution process of the application to be monitored and storing the recorded target performance profiles in the look-up table.

14. The method of claim 12, wherein target performance profiles of the progression over time of performance events of several of the plurality of hardware performance counters for multiple applications to be executed on the application processor and monitored are stored in the look-up table.

15. The method of claim 14, wherein the multiple applications to be executed on the application processor and monitored comprise safety-related and non-safety-related applications.

* * * * *